United States Patent [19]

Moritz

[11] 4,236,750
[45] Dec. 2, 1980

[54] SEAT FOR A PUBLIC TRANSPORT VEHICLE

[75] Inventor: Victor Moritz, Louveciennes, France

[73] Assignee: Societe Orleanaise de Literie et de Mecanique, Paris, France

[21] Appl. No.: 43,044

[22] Filed: May 29, 1979

[51] Int. Cl.³ .......................... A47C 4/52; B60R 21/10
[52] U.S. Cl. ................................ 297/183; 297/216; 297/487
[58] Field of Search ................ 297/183, 216, 487, 488

[56] References Cited

U.S. PATENT DOCUMENTS

| 2,636,552 | 4/1953 | Long | 297/216 |
| 3,112,955 | 12/1963 | Stolz | 297/216 |
| 3,464,751 | 9/1969 | Barecki et al. | 297/216 |
| 3,544,164 | 12/1970 | Ohta | 297/216 |
| 4,077,664 | 3/1978 | Harder, Jr. | 297/183 |

Primary Examiner—James T. McCall
Attorney, Agent, or Firm—Young & Thompson

[57] ABSTRACT

A seat for a public transport vehicle has a handle for use by people who are standing rather than sitting in the vehicle. The handle is mounted in pivot bearings, but is normally restrained from pivoting by a shear pin. In a crash, a seated person may be jerked forward so that his head hits the handle. If this happens, the shear pin breaks so that the handle can pivot forward and does not present an obstacle which could damage the person's head.

3 Claims, 5 Drawing Figures

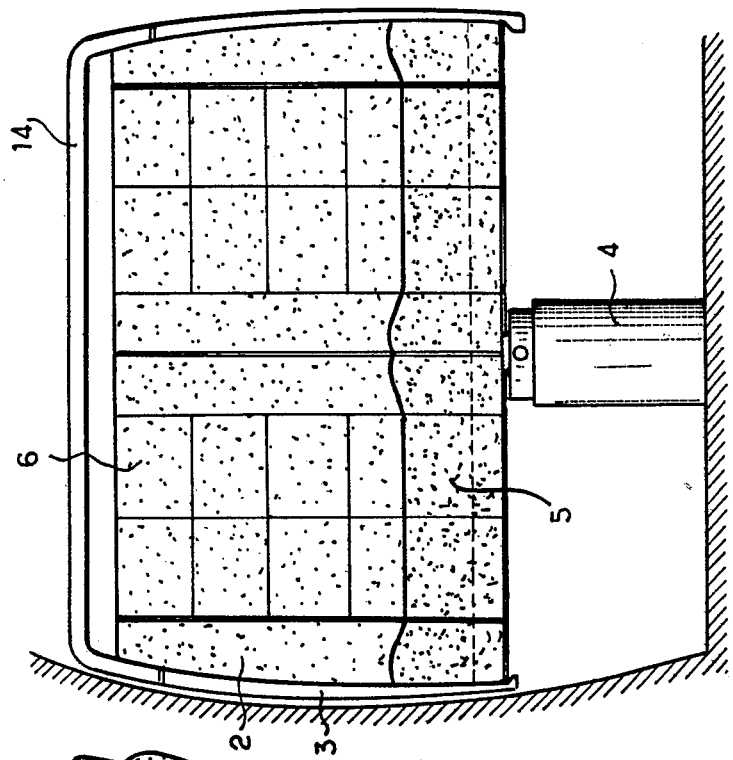
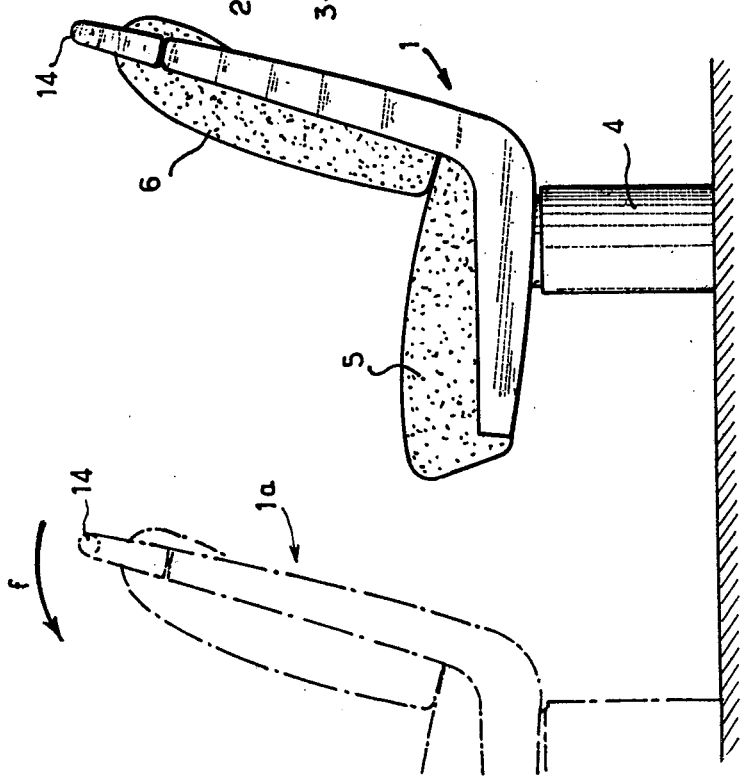

SEAT FOR A PUBLIC TRANSPORT VEHICLE

FIELD OF THE INVENTION

Seats designed for public transport vehicles, for example underground trains or coaches, often comprise a handle on their upper part, which enables occupants of the vehicle who are unable to find a seat and who have to stand, to support themselves to avoid falling. However, in the case of a violent shock, for example due to an accident or violent braking, the head of a seated passenger may hit the handle of the seat immediately in front; there is then a risk that the passenger fractures his skull.

SUMMARY OF THE INVENTION

According to the invention, there is provided a seat for a public transport vehicle, the seat comprising a frame, a backrest and a seat cushion supported by the frame, a handle, pivot means for pivotably supporting the handle on the frame above the backrest, and easily rupturable means for preventing pivoting of the handle under normal conditions of use, said easily rupturable means being adapted to rupture when an abnormally high force is applied to the handle, to permit the handle to pivot.

The rupturable means may comprise a pin passing through a pivot axle mounted pivotably in a bearing, one of the elements constituted by the pivot axle and the bearing being rigid with the frame and the other being rigid with the handle.

When a stress of a value determined as a function of the cross-section of the pin is exerted on the handle, this pin is sheared and the handle may tilt.

BRIEF DESCRIPTION OF THE DRAWINGS

An embodiment of a seat according to the invention is described hereafter, by way of non-limiting example, with reference to the accompanying drawings, in which:

FIG. 1 is a diagrammatic side view of the seat;

FIG. 2 is a rear view;

DETAILED DESCRIPTION OF THE PREFERRED EMBODIMENTS

Figure 3:
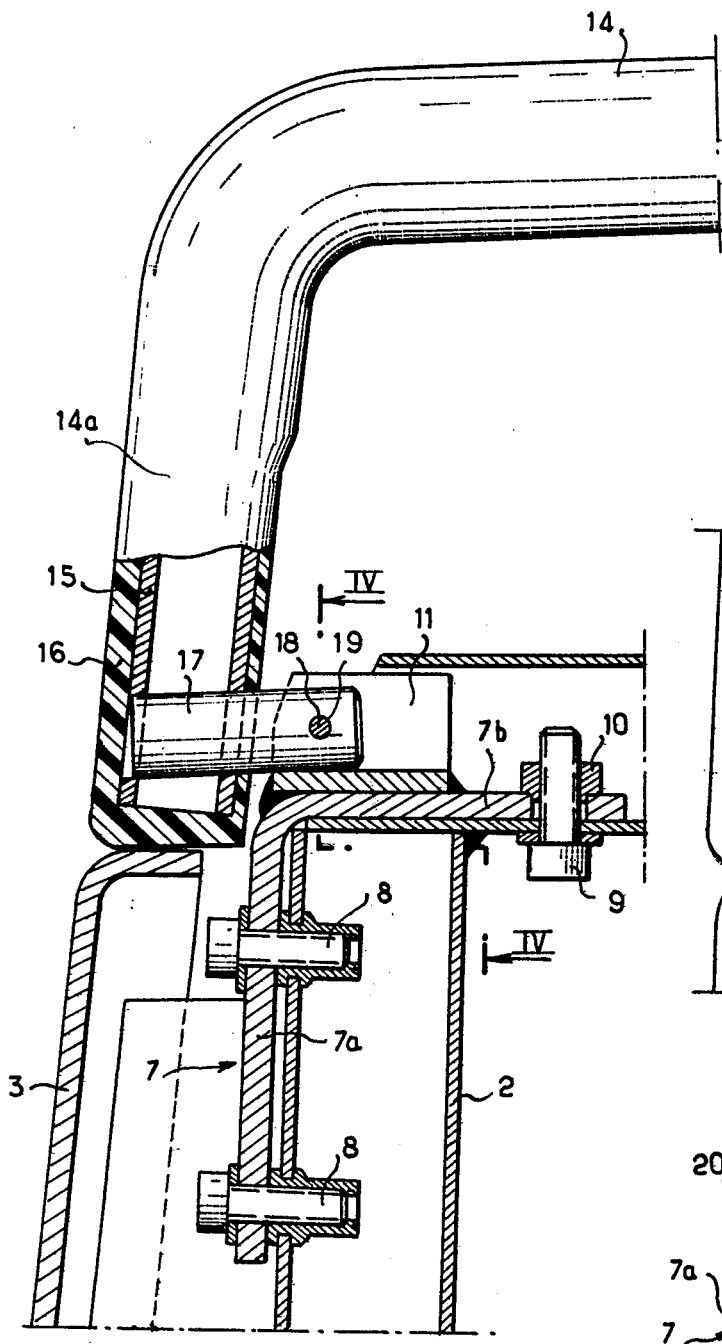
FIG. 3 is a section showing the attachment of the handle to the body of the seat.
Figure 4:
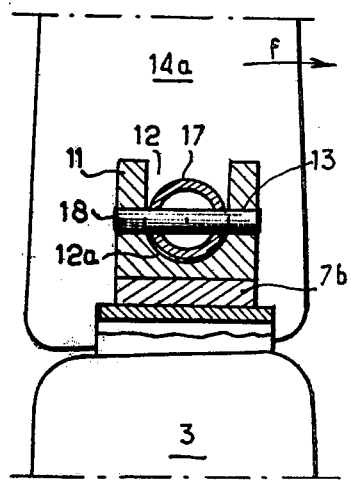
FIG. 4 is a section along line IV—IV of FIG. 3.

As illustrated in the drawings, the seat 1 of the invention comprises a tubular frame 2 which is provided with lateral sheathing 3 and a base support 4. A seat cushion 5 and a backrest 6 are mounted on this frame. An L-shaped iron mounting 7 is disposed on the upper part of the frame 2, on each of the lateral edges. This iron mounting comprises a substantially vertical arm 7a which is fixed to the frame 2 by bolts 8 and an arm 7b which is perpendicular to the arm 7a and which is also fixed to the frame by a bolt 9 screwed onto a screw 10 welded to the said arm 7b.

A channel-section 11 is welded onto the arm 7b of the iron mounting 7 defining a cavity 12 whose base 12a has a semi-circular section. The lateral walls of the channel section 11 are each drilled with a hole 13; the two holes 13 are coaxial and their axis passes through the centre of the semi-circular base 12a of the cavity 12.

A U-shaped handle 14 is provided on the upper part of the frame 2; it extends over the entire width of the seat and comprises a tube 15 having a flexible covering 16. The lateral arms 14a of this handle substantially extend into the extension of the lateral sheathing 3 at each side of the seat. On the lower portion of each arm 14a, there is a transverse nipple 17 which is inwardly directed. The nipple 17 has a circular section of substantially the same radius as the base 12a of the cavity 12, and is engaged in this cavity. The nipples 17 thus constitute pivots which enable the handle 14 to tip towards the front of the seat (as shown by arrow f in FIG. 1) with respect to the frame 2.

A pin 18 is engaged in a hole 19 provided at the end of one of the nipples and in the holes 13 of the channel section 11. This pin thus prevents the handle from pivoting and maintains it in the position shown in FIG. 2 in which it forms an extension of the frame. In a preferred embodiment, there is a pin 18 in the nipple 17 at each end of the handle.

In normal conditions, the handle 14 is maintained by the pin 18 in the position shown in FIG. 3. If there is a sudden shock and the head of the passenger seated on a seat 1 hits the handle 14 of a seat 1a located immediately in front, the covering 16 deadens the shock, then the pins 18 on the seat 1a break as a result of the shearing stress to which they are subjected and the handle 14 tips forward, as indicated by the arrow f, about the axle of the nipples 17, which prevents the passenger from fracturing his or her skull.

Figure 5:
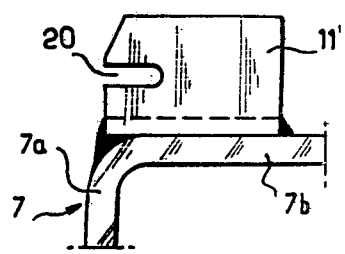
FIG. 5 is an elevation of an alternative component of the seat.

FIG. 5 shows an alternative form of channel section 11. In this alternative form, the holes 13 are replaced by slots 20 extending in the longitudinal direction of the section and opening externally; these slots enable the manufacturing tolerances of the frame 2 and the handle 14 to be absorbed.

I claim:

1. A seat for a public transport vehicle, the seat comprising:
    a frame,
    a backrest and a seat cushion supported by the frame;
    a handle,
    pivot means for pivotably supporting the handle on the frame above the backrest for pivotal movement in either direction about an axis parallel to the plane of the backrest, and
    easily rupturable means for preventing pivoting of the handle about said axis under normal conditions of use, said easily rupturable means being adapted to rupture when an abnormally high force is applied to the handle, to permit the handle to pivot about said axis.

2. The seat of claim 1, wherein said pivot means comprises a pivot axle lying in a bearing, one of the elements constituted by the pivot axle and the bearing being rigid with the frame and the other with the handle, and wherein said easily rupturable means comprises a pin passing through the pivot axle and the bearing.

3. The seat of claim 1, and wherein the handle has a resilient covering.

* * * * *